(12) United States Patent
Damiens et al.

(10) Patent No.: US 12,704,207 B2
(45) Date of Patent: Aug. 11, 2026

(54) FLEXIBLE FLUID TRANSPORT PIPE AND ASSOCIATED METHODS

(71) Applicant: TechnipFMC Subsea France, Courbevoie (FR)

(72) Inventors: Alexandre Damiens, Berville (FR); Thomas Epsztein, Rouen (FR); Marcelo Miyazaki, Paris (FR)

(73) Assignee: TechnipFMC Subsea France (FR)

( * ) Notice: Subject to any disclaimer, the term of this patent is extended or adjusted under 35 U.S.C. 154(b) by 523 days.

(21) Appl. No.: 18/251,999

(22) PCT Filed: Nov. 9, 2021

(86) PCT No.: PCT/EP2021/081133

§ 371 (c)(1),
(2) Date: May 5, 2023

(87) PCT Pub. No.: WO2022/096748

PCT Pub. Date: May 12, 2022

(65) Prior Publication Data

US 2024/0019051 A1 Jan. 18, 2024

(30) Foreign Application Priority Data

Nov. 9, 2020 (FR) ..................................... 20 11472

(51) Int. Cl.
*F16L 11/08* (2006.01)
*B29C 48/09* (2019.01)
(Continued)

(52) U.S. Cl.
CPC ............ *F16L 11/083* (2013.01); *B29C 48/09* (2019.02); *B29C 48/21* (2019.02); *B29C 63/10* (2013.01);
(Continued)

(58) Field of Classification Search
CPC ... F16L 11/083; F16L 2011/047; B29C 48/09; B29C 48/21; B29C 63/10;
(Continued)

(56) References Cited

U.S. PATENT DOCUMENTS 4,402,346 A 9/1983 Cheetham et al.
7,445,030 B2 11/2008 Hardy et al.
(Continued)

FOREIGN PATENT DOCUMENTS

EP 1678437 A1 7/2006
EP 2893237 A1 7/2015
(Continued)

OTHER PUBLICATIONS

International Search Report mailed Jan. 5, 2022 in corresponding PCT International Application No. PCT/EP2021/081133.

*Primary Examiner* — David R Deal
(74) *Attorney, Agent, or Firm* — OSTROLENK FABER LLP

(57) ABSTRACT

A flexible pipe designed to transport fluids that includes, from the interior toward the exterior: an internal tubular sheath with an axis (A-A') defining an internal passage for fluid circulation; a composite reinforcing structure applied around the tubular sheath and connected to the tubular sheath; at least one sealing layer made of thermoplastic material applied around the composite reinforcing structure; at least one ply of tensile armor, not connected to the sealing layer, the at least one ply of tensile armor ply comprising at least one armor element wound around the sealing layer; the thickness of the sealing layer being less than 15 mm.

20 Claims, 1 Drawing Sheet

(51) Int. Cl.

| | |
|---|---|
| ***B29C 48/21*** | (2019.01) |
| ***B29C 63/10*** | (2006.01) |
| ***F16L 11/04*** | (2006.01) |
| *B29K 271/00* | (2006.01) |
| *B29K 307/04* | (2006.01) |
| *B29L 9/00* | (2006.01) |
| *B29L 23/00* | (2006.01) |

(52) U.S. Cl.
CPC ...... *B29K 2271/00* (2013.01); *B29K 2307/04* (2013.01); *B29L 2009/00* (2013.01); *B29L 2023/006* (2013.01); *F16L 2011/047* (2013.01)

(58) Field of Classification Search
CPC ............ B29K 2271/00; B29K 2307/04; B29K 2009/00; B29L 2009/00; B29L 2023/006
USPC .......................................................... 138/129
See application file for complete search history.

(56) References Cited

U.S. PATENT DOCUMENTS

| | | | | |
|---|---|---|---|---|
| 9,772,053 | B2 | 9/2017 | Procida | |
| 2013/0312862 | A1* | 11/2013 | Kalman | B32B 5/26 156/60 |
| 2015/0240971 | A1* | 8/2015 | Procida | F16L 11/088 138/134 |
| 2023/0323984 | A1* | 10/2023 | Wang | H01B 13/0036 29/890.144 |

FOREIGN PATENT DOCUMENTS

| | | | | |
|---|---|---|---|---|
| FR | 2987666 | A1 | 9/2013 | |
| WO | WO 9524578 | A1 | 9/1995 | |
| WO | WO-2018091725 | A1 * | 5/2018 | F16L 57/06 |
| WO | WO 2019068757 | A1 | 4/2019 | |
| WO | WO 2020120700 | A1 | 6/2020 | |

* cited by examiner

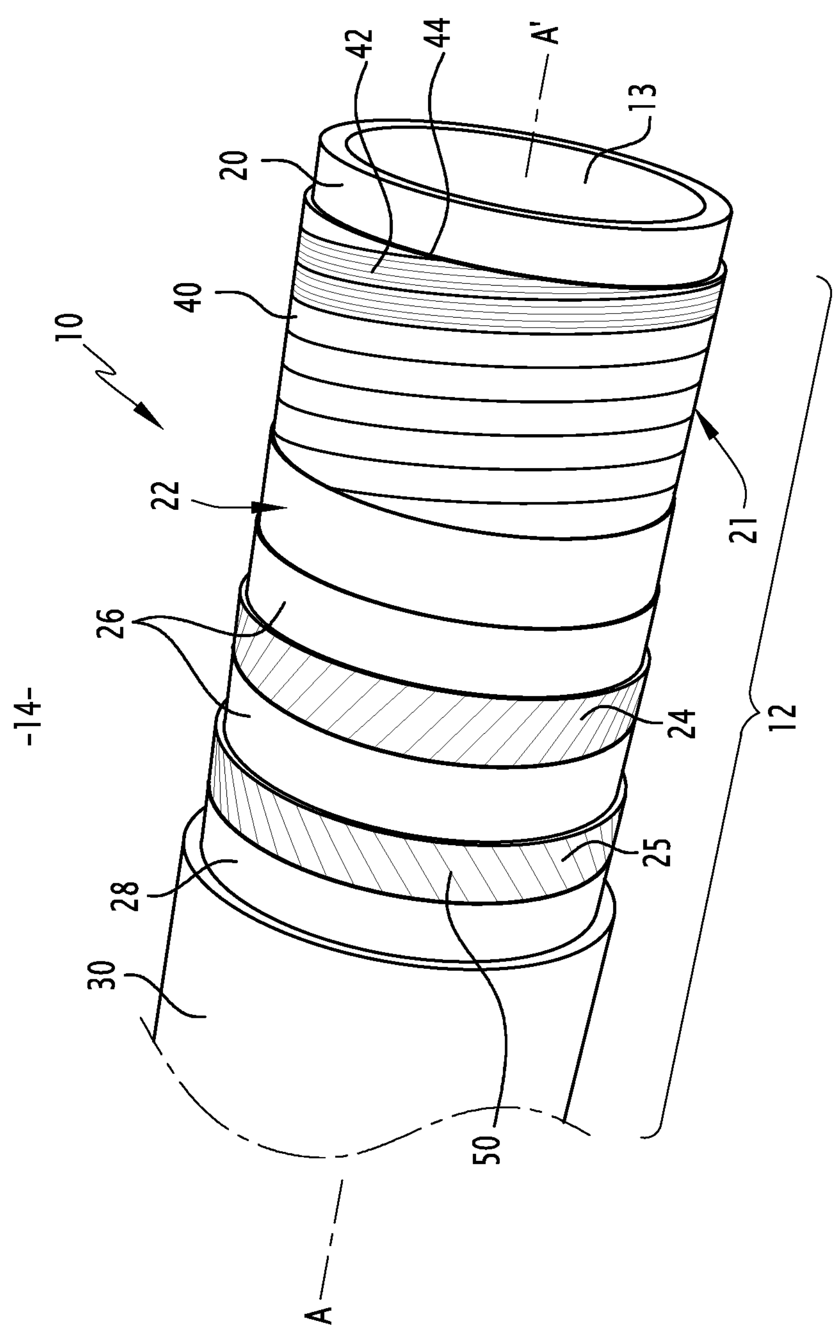
10
12
13
-14-
20
21
22
24
25
26
28
30
40
42
44
50
A
A'

FLEXIBLE FLUID TRANSPORT PIPE AND ASSOCIATED METHODS

CROSS-REFERENCE TO RELATED APPLICATIONS

The present application is a 35 U.S.C. §§ 371 national stage application of International Application No. PCT/EP2021/081133, filed Nov. 9, 2021, which claims priority to French Patent Application No. 20 11472, filed Nov. 9, 2020, the contents of which are incorporated herein by reference.

FIELD OF THE INVENTION

The present invention relates to a flexible underwater pipe for the transport of fluids comprising, from the inside to the outside:

- a tubular inner sheath of axis (A-A') defining an internal passage for the circulation of fluids;
- a composite reinforcement structure applied around the tubular sheath and bonded to the tubular sheath;
- at least one sealing layer of thermoplastic material applied around the composite reinforcement structure;
- at least one ply of tensile armor, unbonded to the sealing layer, the at least one ply of tensile armor comprising at least one armor element wound around the sealing layer; and
- optionally an external sealing sheath arranged around the at least one ply of tensile armor.

BACKGROUND

The tubular structure is e.g., a layer of composite material of a flexible pipe for the transport of fluids through a body of water.

Flexible pipes of the aforementioned type are used especially in deep water in the oil and gas industry as well as in the renewable energy industry. Typically, flexible pipes are used for the transport of hydrocarbon fluids, the reinjection of carbon dioxide into an underwater reservoir or for the transport and distribution of hydrogen produced at sea. Oil-transporting flexible pipes generally extend through a body of water between a surface unit and a bottom unit. Such pipes can also extend between two surface units.

The bottom unit is intended for collecting the fluid operated in the bottom of the body of water. The surface unit is generally a floating unit. It is intended for collecting, potentially treating, and distributing the fluid. The surface unit can be a semi-submersible platform, an FPSO or another floating unit.

In some cases, for the extraction of fluids in deep water, the flexible pipe has a length greater than 800 m, or even greater than 1000 m or than 2000 m for ultra-deep water applications.

For great depths, the flexible pipe is designed to withstand a very high hydrostatic pressure, e.g. 200 bar for a submerged pipe at a depth of 2000 m.

In addition, the flexible pipe is typically designed for withstanding an axial tension greater than the total weight of the flexible pipe suspended from a surface unit and extending underwater from the surface to the seabed. Such is particularly the case when the flexible pipe is used as a riser intended for providing, in service, a vertical connection between the seabed and the surface unit. The ability of the flexible pipe to support its own weight thereof when suspended in water makes easier, the installation thereof at sea from a laying vessel.

Hence, for great depths, it is advantageous to use flexible pipes which are both light and very resistant to external hydrostatic pressure. It is also preferred that the flexible pipes are resistant to the internal pressures encountered in production. It is also advantageous for the flexible pipes to have excellent resistance to fatigue, in particular to withstand the multiple displacement cycles of the pipe under the effect of the movements of the body of water and of the surface unit.

Most flexible pipes used in the offshore oil industry are unbonded flexible pipes comprising at least one sealing sheath reinforced by at least one reinforcement layer consisting of metal wires wound helically around the sealing sheath. Such pipes are described in particular in the normative document API 17J, "Specification for Unbonded Flexible Pipe", 4th edition, May 2014 published by the American Petroleum Institute. However, such flexible pipes generally have a high weight, which makes the installation thereof in deep and ultra-deep water, complex and expensive. In addition, risers of such type generally have to be equipped with buoys for applications at great depth, which entails additional expenses. Finally, the reinforcement metal layers are generally sensitive to corrosion, in particular to corrosion under the influence of acid gases such as $H_2S$ and $CO_2$ present in the hydrocarbons of certain deposits. To overcome such problems, lightweight flexible pipes are known, which include a tubular reinforcement structure made of composite material comprising a matrix and reinforcement fibers embedded in the matrix.

In particular, pipes are known wherein the tubular reinforcement structure consists of a composite material with a thermoplastic matrix, e.g. a composite material comprising a PEEK (polyetheretherketone) matrix reinforced by carbon fibers. Such pipes are known under the name "Thermoplastic Composite pipe" (TCP) and are described in particular in the normative document DNVGL-ST-F119, "Standard Practice—Thermoplastic composites pipes", published in September 2019 by DNV GL (Det Norske Veritas GL).

TCP flexible pipes generally include, from the inside to the outside, a tubular inner sealing sheath made of polymer material ("polymer liner"), a tubular reinforcement structure made of composite material and an outer protective sheath ("cover") made of polymer material. Since the tubular reinforcement structure is theoretically sealed, the tubular inner sheath is optional. However, in practice, most of the flexible pipes include a tubular inner sheath for providing the leak-tightness of the pipe in the event that the tubular reinforcement structure would have a manufacturing defect affecting the leak-tightness thereof. Furthermore, the presence of the tubular inner sheath makes the manufacture the TCP flexible pipe easier. In fact, the first layer then forms a central core which supports the winding of the plurality of composite laminates forming the tubular reinforcement structure.

The tubular reinforcement structure is typically bonded or welded to the tubular inner sheath in order to prevent a collapse of the tubular inner sheath during a rapid decompression of the pipe transporting hydrocarbons in the gaseous phase. The external protective sheath is optional but when present, same is advantageously either bonded or welded to the tubular reinforcement structure, the unit thus forming a flexible TCP pipe with a completely bonded structure. Such TCP pipes are marketed in particular by the companies Magma Global Ltd (TCP of registered trademark m-pipe®) and Airborne Oil & Gas B.V. Same are described in particular in GB2526986A, WO2014/023943, WO2012/118378, WO2006/107196 and EP1090243B1.

Flexible pipes similar to TCP flexible pipes are also known wherein the tubular reinforcement structure consists of a composite material with a thermosetting matrix, e.g. a composite including an epoxy resin matrix reinforced by glass fibers. Such pipes generally have less flexibility than TCP pipes.

Flexible pipes called "hybrid" are also known which have an intermediate structure between the structure of TCP flexible pipes and the structure of unbonded flexible pipes. Such pipes comprise, from the inside to the outside, a tubular internal sealing sheath, a tubular reinforcement structure made of composite material, at least one ply of tensile armor and an external sheath. The tubular reinforcement structure is advantageously made of a composite material with a thermoplastic matrix, but it is also possible to use a thermosetting matrix. The tubular reinforcement structure is advantageously welded or bonded to the tubular inner sheath. The ply or plies of tensile armor are similar to same of unbonded flexible pipes, i.e. same consist of helically wound wires. Furthermore, optionally, the pipes can include an internal carcass situated inside the internal sealing sheath, the function of said internal carcass being to increase the resistance to collapse of the pipe. The internal carcass is formed, e.g., by a profiled metal strip, wound in a spiral. The turns of the strip are advantageously stapled to each other, which makes it possible to take up the crushing forces.

Such hybrid flexible pipes are described in WO00/70256 and in the article "Unbonded Flexible Pipe: Composite reinforcement for Optimized Hybrid Design" written by N. Dodds, V. J H A, J. Latto and D. Finch, and published as OTC-25753 at the Offshore Technology Conference held in Houston from 4 to 7 May 2015.

The tubular reinforcement structure comprises a tube made of composite material and has the function of both a pressure vault arranged outside a tubular inner sheath and a carcass arranged inside the tubular inner sheath, i.e. same generally takes up most of the radial forces applied to the pipe.

The tubular reinforcement structure, bonded to the tubular inner sealing sheath, also has a barrier function against gases, such as acid gases like $H_2S$ and $CO_2$ contained in the hydrocarbon fluids transported inside the tubular inner sealing sheath. Same thus protects the metal reinforcement elements of the flexible pipe against corrosion phenomena.

Such a pipe is not entirely satisfactory however. Under conditions of high hydrostatic pressures, more particularly at great depths, water is likely to seep into such a flexible pipe. The composite tubular structure of the flexible pipe is then likely to become brittle, resulting in an increased risk of leakage of the transported fluid.

The critical pressure from which water is likely to enter the hybrid flexible pipe, as well as the amount of water which infiltrate thereinto, depend on the quality of the bonding between the different layers of the flexible pipe and between the thermoplastic matrix and the reinforcement material, within the tubular reinforcement structure.

Other parameters can also influence the critical pressure value, namely the mechanical loads on the flexible pipe structure before the commissioning of the flexible pipe. E.g., the pressure forces undergone by the flexible pipe following the completion of a Factory Acceptance Test or further, the bending forces of winding the pipe during the storage thereof on a reel after manufacture and/or unwinding of the pipe during the installation thereof at sea.

The introduction of water into the hybrid flexible pipe leads to the appearance of discontinuities in the composite material forming the tubular reinforcement structure, resulting in a significant drop in the impermeability of the tubular composite structure. The acid gases transported in the pipe then diffuse more intensely through the tubular structure resulting in the corrosion of the tensile armor plies.

The above can lead, in certain cases, to irreversible damage to the pipe.

SUMMARY OF THE INVENTION

A goal of the invention is thus to obtain a hybrid flexible pipe with a composite structure which stays intact over time, in particular at high hydrostatic pressure.

To this end, the subject matter of the invention is a flexible pipe of the aforementioned type, wherein the thickness of the sealing layer is less than 15 mm.

The flexible pipe according to the invention can comprise one or a plurality of the following features, taken individually or according to any technically possible combination:

- the sealing layer has a water permeability coefficient of less than 2.10-4 $cm^3(STP)\cdot cm^{-2}\cdot s^{-1}\cdot bar^{-1}$;
- the composite reinforcement structure comprises a winding of at least two laminated reinforcement layers, each reinforcement layer being made from a thermoplastic matrix reinforced with reinforcement fibers;
- the reinforcement layer is made from a thermoplastic matrix of polyetheretherketone (PEEK) reinforced with carbon fibers;
- the sealing layer contains no reinforcement materials;
- the sealing layer is formed by winding at least two strips of thermoplastic material and by welding the at least two strips together;
- when the sealing layer is formed by the winding at least two strips of thermoplastic material and by the welding of the at least two strips together, the thickness of the sealing layer is less than 3 mm, advantageously less than 2 mm, even more advantageously less than 1 mm;
- the sealing layer is formed from a tubular sheath of extruded thermoplastic material;
- when the sealing layer is formed from a tubular sheath of extruded thermoplastic material, the thickness of the sealing layer is from 3 to 15 mm, preferentially from 3 mm to mm;
- the sealing layer is bonded to the composite reinforcement structure;
- the sealing layer is not bonded to the composite reinforcement structure;
- the sealing layer is made from a thermoplastic material selected from polyolefins, polyamides, fluoropolymers, thermoplastic elastomers, polyaryletherketones, copolymers thereof, any of the mixtures thereof and mixtures comprising same, preferentially amongst polyaryletherketones;
- the sealing layer is made from the same thermoplastic material as the material used for the thermoplastic matrix of each reinforcement layer of the composite reinforcement structure, advantageously from polyetheretherketone (PEEK).

A further subject matter of the invention is a manufacturing method for a flexible pipe, comprising the following steps:

- provision of a tubular sheath of central axis (A-A') defining an internal passage for the circulation of fluids;
- formation of a composite reinforcement structure applied around the tubular sheath and bonded to the tubular sheath;
- formation, around the composite reinforcement structure, of a sealing layer of thermoplastic material, arrangement, around the sealing layer, of at least one ply of tensile armor, not bonded to the sealing layer, the at least one ply of tensile armor comprising at least one armor element wound around the sealing layer; and optionally, arrangement of an external sealing sheath arranged around the at least one ply of tensile armor;

wherein the thickness of the sealing layer is less than 15 mm.

The method according to the invention can comprise one or a plurality of the following features, taken individually:

the formation of the sealing layer is carried out by winding at least two strips of a thermoplastic material around the composite reinforcement structure, and by welding the at least two strips together; or the sealing layer is formed by extruding a thermoplastic material onto the composite reinforcement structure.

BRIEF DESCRIPTION OF THE FIGURE

The invention will be better understood upon reading the following description, given only as an example and making reference to the enclosed drawings, wherein:

FIG. 1 is a partially cutaway perspective view of a flexible pipe according to the invention.

DETAILED DESCRIPTION

Hereinafter, the terms "outer" or "external" and "inner" or "internal" are understood as being farther radially from the axis of the flexible pipe and as being closer radially to the axis of the flexible pipe, respectively.

A flexible pipe 10 according to the invention is illustrated schematically in FIG. 1.

The flexible pipe 10 includes a central section 12 illustrated, in part, in FIG. 1. Same includes, at each of the axial ends of the central section 12, an end tip (not shown).

The flexible pipe 10 according to the invention is not limited to a certain category of end-piece. Examples of end-pieces which can be used with the flexible pipes 10 of the invention are described in WO 2019/068757.

With reference to FIG. 1, the pipe 10 delimits an internal passage 13 for the circulation of a fluid, advantageously a petroleum fluid. The internal passage 13 extends along an axis A-A', between the upstream end and the downstream end of the pipe 10. Same comes out through the end-pieces (not shown).

The flexible pipe 10 is intended for being arranged through a body of water 14 in an installation for extracting fluids, in particular hydrocarbons.

The body of water 14 is e.g. a sea, a lake or an ocean. The depth of the body of water 14 at the installation for using fluids is comprised e.g. between 500 m and 4000 m.

The installation includes a surface unit and a bottom unit (not shown) or two surface units which are advantageously connected by the flexible pipe 10.

The surface unit is e.g. floating. Same is advantageously formed by a Floating Production, Storage and Offloading (FPSO) unit, a Floating liquefied natural gas (FLNG) unit, a semi-submersible platform or an offloading buoy. As a variant, the surface unit is a fixed rigid "jacket" structure or an oscillating structure secured to the sea bed, which can be, e.g. a TLP (Tension Leg Platform).

In said example, the flexible pipe 10 connects the bottom unit to the surface unit. The flexible pipe 10 is thus partially immersed in the body of water 14 and has an upper end arranged in a volume of air.

In a variant, the flexible pipe 10 is totally immersed in the body of water 14 and connects e.g. two bottom units (not shown) to one another.

Another variant consists of a flexible pipe 10 partially immersed in the body of water 14 and connecting e.g. two surface units (typically an offloading buoy and an FPSO). Such is, in particular, the case for flexible Oil Offloading Lines (OOL).

As illustrated in FIG. 1, the pipe 10 delimits a plurality of concentric layers about the axis A-A', which extend continuously along the central section 12 as far as the end-pieces situated at the ends of the pipe.

In the example shown in FIG. 1, the pipe 10 includes at least one tubular inner sheath 20 based on polymer material advantageously forming an inner sealing sheath, a tubular reinforcement composite structure 21 applied around the tubular sheath 20 while being bonded thereto, and a sealing layer 22 applied around the composite reinforcement structure 21. In a variant, the pipe 10 does not have a tubular inner sheath 20, the composite reinforcement structure 21 then being leak-tight and performing the sealing function.

In said example, the pipe 10 further includes a plurality of tensile armor plies 24, 25 arranged externally with respect to the sealing layer 22, while not being bonded to the sealing layer 22.

Advantageously, and according to the desired use, the pipe 10 further includes anti-wear layers 26, interposed between the sealing layer 22 and the tensile armor plies 24, 25, as well as in-between the tensile armor plies 24, 25. In a known manner, the anti-wear layers 26 consist of one or a plurality of strips of thermoplastic material wound along the axis (A-A') but which are not welded together, unlike the sealing layer 22. The anti-wear layers 26 are thus not leak-tight.

The pipe 10 advantageously further includes a reinforcement tape 28 wound around the tensile armor plies 24, 25 and an outer sheath 30 intended for the mechanical and sealing protection of the pipe 10.

In a known manner, the tubular sheath 20 is intended for confining the fluid conveyed in the passage 13 in a leak-tight manner. The tubular sheath 20 also has the function of protecting the composite reinforcement structure 21 against abrasion associated with the presence of abrasive particles, e.g. sand, within the fluid transported inside the passage 13. The tubular sheath 20 is formed of a polymer, preferentially thermoplastic, material.

E.g. the polymer forming the tubular sheath 20 is chosen from a polyolefin such as polyethylene, a polyamide such as PA11 or PA12, or a fluoropolymer such as polyvinylidene fluoride (PVDF) or copolymers of polyvinylidene fluoride and polyhexafluoropropylene (PVDF-HFP).

In a variant, the tubular sheath 20 comprises a polymer chosen from PEK (polyether ketone), PEEK (polyether ether ketone), PEEKK (polyether ether ketone ketone), PEKK (polyether ketone ketone), PEKEKK (polyether ketone ether ketone ketone), PAI (polyamide-imide), PEI (polyetherimide), PSU (polysulfone), PPSU (polyphenylsulfone), PES (polyethersulfone), PAS (polyarylsulfone), PPE (polyphenylene ether), PPS (polyphenylene sulfide), LCP (liquid crystal polymers), PPA (polyphthalamide), copolymers thereof, and/or mixtures thereof, or further a mixture of one or a plurality thereof with a polysiloxane, PTFE (polytetrafluoroethylene) or PFPE (perfluoropolyether).

The tubular sheath 20 can e.g., comprise a mixture of polyaryletherketone and a polysiloxane, such as same described in the application WO 2019/150060.

Preferentially, the tubular sheath 20 comprises at least 50% by weight of the polymer defined hereinabove (or of the mixture thereof when a mixture is concerned), more preferentially at least 75% by weight, even more preferentially at least 80% by weight, typically at least 90% by weight, with respect to the total weight of the tubular sheath 20.

According to a preferred embodiment, the tubular sheath 20 consists of one of the polymers defined hereinabove or of one of the mixtures defined hereinabove and of fillers and/or additives.

The thickness of the tubular sheath 20 is comprised e.g. between 1 mm and 20 mm.

The tubular sheath 20 is formed by a polymer tube, a strip of assembled polymer material, or an impregnated polymer mat.

When the tubular sheath 20 is formed by a tube, same is advantageously obtained by extrusion of a thermoplastic tube chosen in particular from the polymers mentioned hereinabove.

When the tubular sheath 20 is formed by a strip of assembled polymer material, same is advantageously produced by extrusion and winding of thermoplastic strips of a polymer as described hereinabove. Preferentially, the turns of a first layer are contiguous (edge to edge without overlap) and the turns of an upper layer are arranged so as to have an overlap of two adjacent lower strips ensuring the sealing of the tubular sheath 20.

The flexible pipe 10 does not have an inner carcass and referred to by the term "smooth bore". The inner surface of the tubular sheath 20 directly delimits the internal passage 13.

In said example, the composite reinforcement structure 21 is applied directly to the tubular sheath 20. Same is assembled on the tubular sheath 20 to form a unit bond to the tubular sheath 20.

The composite reinforcement structure 21 includes at least one, preferentially a plurality of laminated composite reinforcement layers, and optionally, an anti-delamination layer interposed between at least two reinforcement layers.

Each laminated reinforcement layer has an overlaying of composite reinforcement layers.

With reference to FIG. 1, each composite reinforcement layer includes a polymer matrix 40 and reinforcement fibers 42 embedded in the matrix 40.

Preferentially, the matrix 40 is formed from a polymer, in particular a thermoplastic polymer. The polymer of the tubular sheath 20 is advantageously of the same nature as the polymer of the matrix 40. "Of the same nature" as defined by the present invention, means that the polymer of the tubular sheath 20 and the polymer of the matrix 40 are suitable for melting and for forming an intimate mixture, without phase separation, after cooling.

E.g. the polymer forming the matrix 40 is chosen from a polyolefin such as polyethylene, a polyamide such as PA11 or PA12, or a fluoropolymer such as polyvinylidene fluoride (PVDF) or polyvinylidene fluoride and polyhexafluoropropylene (PVDF-HFP) copolymers.

In a variant, the matrix 40 comprises a polymer chosen from PEK (polyether ketone), PEEK (polyether ether ketone), PEEKK (polyether ether ketone ketone), PEKK (polyether ketone ketone), PEKEKK (polyether ketone ether ketone ketone), PAI (polyamide-imide), PEI (polyether-imide), PSU (polysulfone), PPSU (polyphenylsulfone), PES (polyethersulfone), PAS (polyarylsulfone), PPE (polyphenylene ether), PPS (polyphenylene sulfide), LCP (liquid crystal polymers), PPA (polyphthalamide), copolymers thereof and/or mixtures thereof or a mixture of one or a plurality thereof with a polysiloxane, PTFE (polytetrafluoroethylene) or PFPE (perfluoropolyether).

The matrix 40 can e.g. comprise a mixture of polyaryletherketone and a polysiloxane, e.g. such as same described in application WO2019/150060. Preferentially, the matrix 40 comprises at least 50% by weight of the polymer defined hereinabove (or of the mixture of the latter when a mixture is concerned), more preferentially at least 75% by weight, even more preferentially at least 80% by weight, typically at least 90% by weight, with respect to the total weight of the matrix 40.

According to a preferred embodiment, the matrix 40 consists of one of the polymers defined hereinabove or of one of the mixtures defined hereinabove and of fillers and/or additives.

The reinforcement fibers 42 are e.g. carbon fibers, glass fibers, aramid fibers, and/or basalt fibers.

The reinforcement fibers 42 generally have a maximum tensile strength of greater than 2 GPa, advantageously greater than 3 GPa and comprised e.g. between 3 GPa and 6 GPa, as measured at 23° C. as per the standard ASTM D885M-10A(2014)e1.

In the present application, the terms "maximum tensile strength" and "tensile strength" have the same meaning and refer to the ultimate tensile strength measured during a tensile test.

Furthermore, the reinforcement fibers 42 advantageously have a tensile modulus greater than 50 GPa, comprised e.g. between 70 GPa and 500 GPa, in particular between GPa and 100 GPa for glass fibers, between 100 GPa and 500 GPa for carbon fibers and between 50 GPa and 200 GPa for aramid fibers, as measured at 23° C. as per the standard ASTM D885M-10A(2014)e1.

In the present application, the terms "tensile modulus", "Young's modulus" and "tensile modulus of elasticity" have the same meaning and refer the modulus of elasticity measured during a tensile test.

The density of the reinforcement fibers 42 is generally comprised between 1.4 g/cm$^3$ and 3.0 g/cm$^3$.

The reinforcement fibers 42 are e.g. unidirectionally arranged in the matrix 40 for each of the composite reinforcement layers. Same are then parallel to each other. In a variant, the reinforcement fibers 42 cross over along two orthogonal directions, or else are arranged randomly in the matrix (not shown).

The length of the reinforcement fibers 42 in each composite layer is greater than 100 m, and is in particular comprised between 100 m and 4500 m.

The diameter of the composite fibers is e.g. less than 100 microns, and is in particular comprised between 4 microns and 10 microns.

Preferentially, each reinforcement composite layer is formed by a winding of at least one composite strip 44 having a plurality of layers of fibers 42 embedded in an elongated matrix 40 with a length greater than at least 10 times the width thereof and at least 10 times the thickness thereof.

E.g. the length of each composite strip 44 is greater than 100 m and is comprised between 100 m and 4500 m. The width of each composite strip 44 is comprised between 6 mm and 50 mm. The thickness of each composite strip 44 is comprised between 0.1 mm and 1 mm.

Each composite strip 44 thus has, at 23° C., a tensile modulus greater than 10 GPa, in particular comprised between 30 GPa and 170 GPa, as measured by the standard NF EN 2561, January 1996, an elongation at break greater than 1%, in particular comprised between 1% and 5%, as measured by the standard NF EN 2561, January 1996, and a maximum tensile strength greater than 100 MPa, and in particular comprised between 350 MPa and 3500 MPa as measured by the standard NF EN 2561, January 1996.

During the production of each reinforcement layer, the or each composite strip 44 is wound helically about the axis A-A' of the tubular sheath 20, and is heated so as to lead to the partial melting of the matrix 40, and the bonding with the successive turns of the composite strip 44, and/or with the adjacent layers which can be other reinforcement layers, anti-delamination layers or the tubular sheath 20.

The absolute value of the winding helix angle β of each composite strip 44 with respect to the axis A-A' of the pipe 10 is comprised e.g. between 55° and 85°. The above ensures an elongation of the composite under the effect of the internal pressure, and a suitable cooperation with the armor plies 24, 25.

The thickness of each composite layer is generally comprised between 0.10 mm and mm, e.g. between 0.12 mm and 7 mm, or between 0.22 mm and 5 mm.

The sealing layer 22 is intended for confining the composite reinforcement structure 21 in a sealed manner. More particularly, and in the event of water infiltration inside the flexible pipe 10, between the outer sheath 30 and the sealing layer 22, the function of the layer 22 is to limit, preferentially to prevent, a contact between the infiltrated water and the composite reinforcement structure 21.

The sealing layer 22 can be bonded or not bonded to the composite reinforcement structure 21.

The permeability of the sealing layer depends on the material chosen for the production thereof and on the temperature to which the layer is subsequently exposed.

The water permeability of the polymer materials which are suitable for producing the sealing layer 22 is comprised between $1\times10^{-7}$ cm$^3$ (STP)·cm$^{-1}$·s$^{-1}$·bar$^{-1}$ and $2\times10^{-5}$ cm$^3$ (STP)·cm$^{-2}$·s$^{-1}$·bar$^{-1}$.

Henceforth, for a thickness of the sealing layer 22 comprised between 1 mm and 20 mm, the water permeability of the layer is $5\times10^{-8}$ cm$^3$ (STP)·cm$^{-2}$·s$^{-1}$·bar$^{-1}$ to $2\times10^{-4}$ cm$^3$ (STP)·cm$^{-2}$·s$^{-1}$·bar$^{-1}$.

The term "permeability of the sealing layer 22" as defined by the invention, refers to the ability of said sealing layer 22 as a whole to let water flow through. The permeability of the sealing layer can be different from the permeability of the material forming the layer, in particular due to the presence of any discontinuities or faults in the sealing layer which would facilitate the passage of water or because the sealing layer is made of a discontinuous structure such as a wound strip. The permeability of the sealing layer is understood herein as the permeability of the layer as a whole including the material and any interstices or interfaces between the discontinuous regions forming the layer. Within the framework of the invention, the permeability measurement refers to the permeability of the sealing layer as a whole, such as same is present in the flexible pipe 10 of the invention.

The water permeability of the material forming the sealing layer 22 can be measured by the weight loss technique. Such method of measuring the permeability of a liquid is described in particular in the publication "Emmanuel RICHAUD, Bruno FLACONNÈCHE, Jacques VERDU—*Biodiesel permeability in polyethylene*—Polymer Testing—Vol. 31, p. 170-1076-2012. Knowing the water permeability of the material, it is then possible to calculate the permeability of the sealing layer 22 by applying the following formula:

$$Klayer = \frac{Kmat.}{e}$$

with:

Klayer, the water permeability of the sealing layer (expressed in cm$^3$ (STP)·cm$^{-1}$·s$^{-1}$·bar$^{-1}$), Kmat., the permeability of the material forming the sealing layer (expressed in cm$^3$ (STP)·cm$^{-2}$·s$^{-1}$·bar$^{-1}$), and e, the thickness of the sealing layer 22 (expressed in cm).

The sealing layer 22 is made of a thermoplastic material. E.g., the polymer forming the sealing layer 22 is chosen from a polyolefin, crosslinked if appropriate, such as polyethylene or polypropylene; a thermoplastic elastomer (TPE) such as thermoplastic polyurethane (TPE-U or TPU) or styrene copolymers (TPE-S or TPS) or vulcanized copolymers of polypropylene and ethylene-propylene-diene monomer (PP-EPDM) (TPE-V or TPV); a polyamide such as PA11 or PA12; or a fluoropolymer such as polyvinylidene fluoride (PVDF) or copolymers of polyvinylidene fluoride and polyhexafluoropropylene (PVDF-HFP).

In a variant, the sealing layer 22 comprises a polymer selected from PEK (polyether ketone), PEEK (polyether ether ketone), PEEKK (polyether ether ketone ketone), PEKK (polyether ketone ketone), PEKEKK (polyether ether ketone ether ketone ketone), PAI (polyamide-imide), PEI (polyether-imide), PSU (polysulfone), PPSU (polyphenylsulfone), PES (polyethersulfone), PAS (polyarylsulfone), PPE (polyphenylene ether), PPS (polyphenylene sulfide), LCP (liquid crystal polymers), PPA (polyphthalamide) and/or mixtures thereof or further a mixture of one or a plurality thereof with a polysiloxane, PTFE (polytetrafluoroethylene) or PFPE (perfluoropolyether).

The sealing layer 22 can e.g. comprise a mixture of polyaryletherketone and a polysiloxane, such as same described in the application WO2019/150060.

Preferentially, the sealing layer 22 comprises at least 50% by weight of the polymer defined above (or of the mixture thereof when a mixture is concerned), more preferentially at least 75% by weight, even more preferentially at least 80% by weight, typically at least 90% by weight, with respect to the total mass of the sealing layer 22.

According to a preferred embodiment, the sealing layer 22 consists of one of the polymers defined above or of one of the mixtures thereof and of fillers and/or additives.

The polymer of the sealing layer 22 is advantageously of the same nature as the polymer of the matrix 40, more advantageously of the same nature as the polymer of the matrix 40 and the polymer of the sheath 20. "Of the same nature" as defined by the present invention, means that the polymer of the sealing layer 22 and the polymer of the matrix 40, and, if appropriate, the polymer of the tubular sheath 20, are suitable for melting and for forming an intimate mixture, without phase separation, after cooling.

According to a preferred embodiment, the sealing layer 22 consists of a thermoplastic material. In particular, the sealing layer 22 contains no reinforcement materials.

Preferentially, the sealing layer 22 is continuous. "Continuous" as defined by the invention, means that the structure of the sealing layer 22 is identical in every point. More particularly, the sealing layer 22 does not comprise any radial through holes which could facilitate the flow of a fluid, in particular water, through the layer. A sealing layer 22 having a closed porosity is thus considered to be homogeneous as defined by the invention.

The thickness of the sealing layer is comprised e.g. between 1 mm and 20 mm, preferentially less than or equal to 15 mm.

In the present case, the sealing layer 22 is formed as a single piece of a tubular sheath made of polymer material.

In a variant, the sealing layer 22 is made from a discontinuous structure, e.g. a strip of assembled polymer material.

When the sealing layer 22 is formed by a tubular sheath, same is advantageously obtained by extruding a thermoplastic material around the composite reinforcement structure 21, the material being chosen in particular from the aforementioned polymers. In the first case, the thickness of the sealing layer 22 is typically from 3 to 15 mm, preferentially from 4 mm to 10 mm.

When the sealing layer 22 is formed by a strip of assembled polymer material, it is advantageously produced by winding thermoplastic strips of a polymer as described hereinabove, followed by a step of welding the thermoplastic strips. Preferentially, the turns of a first layer are contiguous (edge to edge without overlap) and the turns of an upper layer are arranged so as to have an overlap of two adjacent lower strips ensuring the sealing of the sealing layer 22. In the second case, the thickness of the sealing layer 22 is typically less than 3 mm, advantageously less than 2 mm, even more advantageously less than 1 mm According to a first embodiment, the sealing layer 22 is not bonded to the composite reinforcement structure 21 and contains no reinforcement materials.

According to this first embodiment, the polymer forming the sealing layer 22 is chosen from a polyolefin, crosslinked if appropriate, such as polyethylene or polypropylene; a thermoplastic elastomer (TPE) such as thermoplastic polyurethane (TPE-U or TPU) or styrene copolymers (TPE-S or TPS) or vulcanized copolymers of polypropylene and ethylene-propylene-diene monomer (PP-EPDM) (TPE-V or TPV); a polyamide such as PA11 or PA12; a fluoropolymer such as polyvinylidene fluoride (PVDF) or copolymers of polyvinylidene fluoride and polyhexafluoropropylene (PVDF-HFP).

The sealing layer 22 is then formed by a tubular sheath obtained by extruding a thermoplastic material around the composite reinforcement structure 21. The sealing layer 22 then has a thickness which is typically from 3 to 15 mm, preferentially from 4 mm to 10 mm.

According to a second embodiment, the sealing layer 22 is bonded to the reinforcement composite structure 21 and contains no reinforcement materials.

According to this second embodiment, the sealing layer 22 comprises a polymer chosen from PEK (polyether ketone), PEEK (polyether ether ketone), PEEKK (polyether ether ketone ketone), PEKK (polyether ketone ketone), PEKEKK (polyether ketone ether ketone ketone), PAI (polyamide-imide), PEI (polyether-imide), PSU (polysulfone), PPSU (polyphenylsulfone), PES (polyethersulfone), PAS (polyarylsulfone), PPE (polyphenylene ether), PPS (polyphenylene sulfide), LCP (liquid crystal polymers), PPA (polyphthalamide), copolymers thereof and/or mixtures thereof or a mixture of one or a plurality thereof with a polysiloxane, PTFE (polytetrafluoroethylene) or PFPE (perfluoropolyether). Preferentially, the sealing layer 22 comprises PEEK (polyether ether ketone).

Advantageously, according to the second embodiment, the polymer of the sealing layer 22 is of the same nature as the polymer of the matrix 40, more advantageously of the same nature as the polymer of the matrix 40 and the polymer of the sheath 20.

The sealing layer 22 is then produced by extruding or by winding thermoplastic strips previously obtained by pultrusion (or extrusion by pulling), typically by winding at least two thermoplastic strips, and the sealing layer 22 has a thickness of less than 3 mm, advantageously less than 2 mm, even more advantageously less than 1 mm.

In the example shown in FIG. 1, the flexible pipe 10 includes an inner armor ply 24 and an outer armor ply 25 around which the outer sheath 30 is arranged.

Each armor ply 24, 25 includes longitudinal armor elements 50 wound with a large pitch about the axis A-A' of the pipe.

The term "wound with a large pitch" means that the absolute value of the helix angle with respect to the axis A-A' is less than 55°, typically between 25° and 45°, and sometimes between 20° and 45°.

The armor elements 50 of a first ply 24 are wound generally at an opposite angle with respect to the armor elements 50 of a second ply 25. Thereby, if the angle of winding with respect to the axis A-A' of the armor elements 50 of the first ply 24 is equal to $+\alpha$, $\alpha$ being comprised between 25° and 45°, the angle of winding with respect to the axis A-A' of the armor elements 50 of the second ply 25 arranged in contact with the first ply 24 is e.g. $-\alpha$, with $\alpha$ comprised between 25° and 45°.

The armor elements 50 are formed e.g. by metal wires. In a variant, the armor elements 50 are formed by composite yarns or flat ribbons reinforced with carbon fibers.

The combination of a winding angle $\beta$ of the composite strips 44 with an absolute value comprised between 55° and 85°, preferentially between 60° and 80°, with a winding angle $\alpha$ of the armor elements 50 with an absolute value comprised between 25° and 55°, preferentially between 25° and 45° prevents the elongation of the composite reinforcement structure 21 by the compensation effect produced by the armor plies 24, 25.

Since the composite reinforcement structure 21 can have a low tensile strength and has a tendency to elongate under the effect of axial forces, the armor plies 24, 25 take up the axial forces and thus prevent the composite reinforcement structure 21 from being elongated.

The optimum combination between the winding angles $\alpha$, $\beta$ drastically reduces the stresses in the tubular assembly formed by the inner sheath 20 and the composite reinforcement structure 21, and thus the thickness required for withstanding bending, internal pressure and/or collapse forces.

Furthermore, due to the axial stiffness of the composite reinforcement structure 21, the tensile armor plies 24, 25 resist axial compression better under the external pressure conditions of the deep seabed.

Furthermore, the angle $\alpha$ of winding of the armor elements 50 with an absolute value comprised between 25° and 55°, taken in combination with the angle $\beta$ of winding of the composite strips 44 with an absolute value comprised between 60° and 80°, allows the composite reinforcement structure 21 to be compressed, reducing the minimum bending radius (MBR).

The acceptable tensile deformation at the extrados of the tubular assembly formed by the inner sheath 20 and the composite reinforcement structure 21 is greater than 1%. Such deformation induces the winding radius compatible with most manufacturing and laying equipment.

The outer sheath 30 is intended for preventing the permeation of fluid from the outside of the flexible pipe 10 towards the inside. Same is advantageously made of a polymer material, in particular containing a polyolefin, such as polyethylene, containing a polyamide, such as PA11 or PA12, containing a fluoropolymer such as polyvinylidene fluoride (PVDF), or containing an elastomeric thermoplastic comprising a polyolefin, such as polyethylene or polypropylene, associated with an elastomer such as SBS (styrene butadiene styrene), SEBS (styrene ethylene butadiene styrene), EPDM (ethylene propylene diene monomer), polybutadiene, polyisoprene or polyethylene-butylene.

The width of the outer sheath 30 is comprised e.g. between 5 mm and 15 mm.

Each anti-wear layer 26 is formed e.g. by a polyolefin such as a polyethylene (PE) or a polypropylene (PP), by a polyamide such as PA-11 or PA-12, by a fluoropolymer such as polyvinylidene fluoride (PVDF), by a polyaryletherketone (PAEK) such as polyether ether ketone (PEEK) or polyether ketone ketone (PEKK) or further a polymeric material comprising a sulfonated group such as polysulfone (PSU), polyethersulfone (PES) or polyphenylsulfone (PPSU). An anti-wear layer 26 is arranged between the sealing layer 22 and the first tensile armor ply 24. Another anti-wear layer 26 is placed between the armor plies 24, 25, advantageously as indicated in the standard API 17J, 4th edition May 2014.

The reinforcement tape 28 is formed e.g. By an anti-buckling layer of high strength in order to limit the buckling of the tensile armor 24, 25 in the event that the pipe is subject to the phenomenon of reverse thrust force. Such layer is e.g. made of aramid. The tape is wound around the armor ply 25 situated furthest to the outside, between the armor ply 25 and the outer sheath 30, advantageously as indicated in the standard API 17J standard, 4th edition May 2014.

The method of manufacturing a tubular structure 20 according to the invention will now be described, in the example of the production of a flexible pipe 10.

Thus, a method according to the invention comprises the following steps:

1) the provision of a tubular sheath 20 with a central axis (A-A') defining an internal passage 13 for the circulation of fluids;
2) the formation of a composite reinforcement structure 21 applied around the tubular sheath 20 and bonded to the tubular sheath 20;
3) the formation, around the composite reinforcement structure 21, of a sealing layer 22 made of thermoplastic material,
4) the arrangement, around the sealing layer 22, of at least one tensile armor ply 24, 25 not bonded to the sealing layer 22, the at least one tensile armor ply 24, 25 comprising at least one tensile armor element 50 wound around the sealing layer 22; and,
5) optionally, the arrangement of an external sealing sheath 30 arranged around the at least one tensile armor ply 24, 25.

The process according to the invention can be implemented from any installation known to a person skilled in the art. An installation suitable for implementing the process of the invention is described e.g. in WO 2019/180050.

Initially, the sheath 20 is manufactured and/or is supplied in the installation. Advantageously, the sheath 20 undergoes a preliminary pre-compacting step. The sheath 20 is then heated so as to bring the external surface thereof to a temperature greater than 100° C., and in particular between 100° C. and 350° C.

Preferentially, the sheath 20 should have a shape as cylindrical as possible. To this end, it is possible to shape the outer surface of the sheath by using roller assemblies rotating around the sheath. Such a device is described e.g. in WO 2019/180050.

A plurality of reinforcement layers are then formed around the sheath 20 from the strips 44.

For each reinforcement layer, a plurality of strips 44 are unwound in parallel around the sheath 20. Guide elements may be used to keep the strips 44 parallel to each other, with a controlled play.

The parallel strips 44 are then heated, advantageously to a temperature comprised between 150° C. and 500° C., said temperature depending on the nature of the thermoplastic polymer forming the matrix 40 of the strips 44.

When the matrix 40 of the strips 44 is made of PEEK (melting point on the order of 350° C.), the heating temperature of the strips 44 is advantageously between 350° C. and 500° C. When the matrix 40 of the strips 44 is made of PVDF (melting point on the order of 180° C.), the heating temperature of the strips 44 is advantageously between 180° C. and 280° C., preferentially between 200° C. and 250° C. The above advantageously results in at least partial melting of the matrix 40.

Advantageously, the strips 44 are wound helically around the outer surface defined by the sheath 20.

The absolute value of the winding helix angle β of each composite strip 44 with respect to the axis A-A' of the pipe 10 is comprised e.g. between 50° and 85°, preferentially between 55° and 80°. The above allows the composite reinforcement structure 21 to accommodate radial elongations due to the radial forces generated under the effect of the internal pressure, and a suitable cooperation with the armor plies 24, 25.

Preferentially, and just after the winding thereof, a roller assembly as defined is rotated and applied onto the strips 44 so as to compact the strips. To this end, the successive rollers define a compaction generator which presses on the strips 44.

The strips 44 are compacted uniformly, preventing the disorganization of the fibers 42 present in the matrix 40, while ensuring an effective distribution of the molten material of the matrix 40 so as to form a continuous and sealed composite reinforcement structure 21.

The composite reinforcement structure 21 then undergoes a post-compacting step during which the outer surface of the composite reinforcement structure 21 is softened by heating and then compacted again by the rotating roller assemblies. The rollers of the roller assemblies roll on a helical path along the respective strips 44, ensuring a minimum disorganization of the reinforcement fibers 42.

Advantageously, the operations of pre-compacting, forming the tubular structure and of post-compacting are repeated for forming a plurality of concentric reinforcement layers with other strips 44, as described hereinabove.

The composite reinforcement structure 21 is thus manufactured layer by layer, each new outer layer having a thickness substantially equal to the thickness of a strip 44. Such operations can be repeated several tens of times, in particular when the strip or strips 44 have a thickness significantly less than the final thickness of the wall of the desired composite reinforcement structure 21.

In addition, the features of the strips 44 and/or the laying and/or compacting parameters can be modified each time a new layer is added. E.g. it is possible to modify the helix angle of the strips 44, in particular so as to cross the fibers of two overlaid layers.

The sealing layer 22 is then formed around the composite reinforcement structure 21.

According to a first embodiment, the sealing layer 22 is formed by the extrusion of a thermoplastic chosen from the polymers mentioned hereinabove. Preferentially, according to said embodiment, the thermoplastic material is extruded directly onto the composite reinforcement structure 21.

According to the first embodiment, the thickness of the sealing layer 22 is typically from 3 to 15 mm, preferentially from 3 mm to 10 mm.

According to a second embodiment, the sealing layer 22 is formed by winding around the composite reinforcement structure 21 thermoplastic strips of a polymer as described hereinabove, followed by welding the strips. Preferentially, the turns of a first layer are contiguous (edge to edge without overlap) and the turns of an upper layer are arranged so as to have an overlap of two adjacent lower strips ensuring the sealing of the tubular sheath 20.

Advantageously, the strips 44 forming the composite reinforcement structure 21 and the thermoplastic strips forming the sealing layer 22 are wound with the same winding angle with respect to the axis A-A' of the pipe 10. The absolute value of the helix angle of winding of each composite strip 44 and of each thermoplastic strip with respect to the axis A-A' of the pipe 10 is comprised e.g. between 50° and 85°, preferentially between 55° and 80°.

Preferentially, the sealing layer 22 is obtained by winding at least two thermoplastic strips around the composite reinforcement structure 21. The thermoplastic strips are typically prepared by the extrusion of the thermoplastic material.

According to a variant of embodiment, the sealing layer 22 is a bi-layer arranged around the composite reinforcement structure 21 wherein each layer comprises the winding of at least two thermoplastic strips prepared by the extrusion of the thermoplastic material.

The welding of the thermoplastic strips is carried out according to any known method, typically by heating the junction zones between the strips to a temperature comprised between 150° C. and 500° C., the temperature depending on the nature of the thermoplastic polymer forming the strips.

When the thermoplastic strips are made of PEEK (melting point on the order of 350° C.), the heating temperature is advantageously comprised between 350° C. and 500° C. When the thermoplastic strips are made of PVDF (melting point on the order of 180° C.), the heating temperature is advantageously between 180° C. and 280° C., preferentially between 200° C. and 250° C.

Typically, the welding of the thermoplastic strips is carried out by LASER radiation. The welding of the thermoplastic strips makes possible the formation of a continuous sealing layer 22.

According to the second embodiment, the thickness of the sealing layer 22 is typically less than 3 mm, advantageously less than 2 mm, even more advantageously less than 1 mm.

Where the polymer of the sealing layer 22 is of the same nature as the polymer of the matrix 40 of the composite reinforcement structure 21, the method of the invention can be used for manufacturing flexible pipes 10 wherein the sealing layer 22 is either bonded or not bonded to the composite reinforcement structure 21, depending on the method used to form the sealing layer 22.

According to a first variant, the sealing layer 22 is formed by winding thermoplastic strips around the composite reinforcement structure 21, followed by welding the strips together. In such case, the sealing layer 22 obtained is bonded to the composite reinforcement structure 21.

According to a second variant, the sealing layer 22 is formed by the extrusion of a thermoplastic material. In such case, the bonded or non-bonded character of the sealing layer 22 depends on the temperature at which the extruded thermoplastic material and the reinforcement composite layer 21 are brought into contact. When the extruded thermoplastic material and the composite reinforcement layer 21 are brought into contact at a temperature lower than the melting temperature of the thermoplastic material, the resulting sealing layer 22 is not bonded to the composite reinforcement structure 21. On the other hand, when the extruded thermoplastic material and the composite reinforcement layer are brought into contact at a temperature greater than or equal to the melting temperature of the thermoplastic material, the resulting sealing layer 22 is bonded to the composite reinforcement structure 21.

However, when the polymer of the sealing layer 22 is not of the same nature as the polymer of the matrix 40, the method of the invention leads exclusively to the formation of a sealing layer 22 not bonded to the composite reinforcement structure 21.

The armor elements 50 of the tensile armor plies 24, 25 are then wound around the sealing layer 22, in a manner unbonded to the sealing layer 22. Advantageously, an anti-wear layer 26 is interposed between the sealing layer 22 and the first tensile armor ply 24, and between each tensile armor ply 24, 25.

A reinforcement tape 28 is then wound around the outermost tensile armor ply 25.

The outer sheath 30 is then formed around the armor plies 24, 25.

The compaction provided by the rollers during the formation of the composite reinforcement structure 21 and then during the post-compaction step, reinforces the mechanical properties of the composite reinforcement structure 21, in particular by providing increased interlaminar mechanical strength, a higher degree of crystallinity, and a lower degree of porosity.

The composite reinforcement structure 21 is thus more robust mechanically and has improved sealing against the fluid intended for flowing inside the internal passage 13.

The presence of the sealing layer 22 limits, preferentially completely prevents, the penetration of exterior water into the flexible pipe 10 of the invention. In particular, same protects the composite reinforcement structure 21 against the harmful effects of water, in particular by preventing the formation of discontinuities.

The invention claimed is:

1. A flexible pipe for the transport of fluids, comprising, from the inside to the outside:

a tubular inner sheath of axis (A-A') defining an internal passage for the circulation of fluids;

a composite reinforcement structure applied around the tubular sheath and bonded to the tubular sheath;

at least one sealing layer made of a thermoplastic material applied around the composite reinforcement structure;

at least one tensile armor ply not bonded to the sealing layer, the at least one tensile armor ply comprising at least one armor element wound around the sealing layer; and optionally, an external sealing sheath arranged around the at least one tensile armor ply, wherein the thickness of the sealing layer is less than 15 mm; and wherein the composite reinforcement structure includes at least one laminated composite reinforcement layer, each composite reinforcement layer including a polymer matrix and reinforcement fibers embedded in the matrix.

2. The flexible pipe according to claim 1, wherein the sealing layer has a water permeability coefficient of less than $2.10^{-4}$ cm$^3$ (STP)$\cdot$cm$^{-2}\cdot$s$^{-1}\cdot$bar$^{-1}$.

3. The flexible pipe according to claim 1, wherein the composite reinforcement structure comprises a winding of at least two laminated reinforcement layers, each reinforcement layer being made from a thermoplastic matrix reinforced with reinforcement fibers.

4. The flexible pipe according to claim 3, wherein each reinforcement layer is produced from a thermoplastic matrix of polyether ether ketone (PEEK) reinforced with carbon fibers.

5. The flexible pipe according to claim 3, wherein the sealing layer is made from the same thermoplastic material as used for the thermoplastic matrix of each reinforcement layer of the composite reinforcement structure.

6. The flexible pipe according to claim 5, wherein the sealing layer is made from polyetheretherketone (PEEK).

7. The flexible pipe according to claim 1, wherein the sealing layer contains no reinforcement materials.

8. The flexible pipe according to claim 1, wherein the sealing layer is formed by winding at least two strips of thermoplastic material and welding the at least two strips together.

9. The flexible pipe according to claim 8, wherein the thickness of the sealing layer is less than 3 mm.

10. The flexible pipe according to claim 9, wherein the thickness of the sealing layer is less than 2 mm.

11. The flexible pipe according to claim 1, wherein the sealing layer is formed from a tubular sheath of extruded thermoplastic material.

12. The flexible pipe according to claim 11, wherein the thickness of the sealing layer is from 3 to 15 mm.

13. The flexible pipe according to claim 11, wherein the thickness of the sealing layer is less than 1 mm.

14. The flexible pipe according to claim 1, wherein the sealing layer is bonded to the composite reinforcement structure.

15. The flexible pipe according to claim 1, wherein the sealing layer is unbonded to the composite reinforcement structure.

16. The flexible pipe according to claim 1, wherein the sealing layer is made from a thermoplastic material selected from polyolefins, polyamides, fluoropolymers, thermoplastic elastomers, polyaryletherketones, copolymers thereof, any of the mixtures thereof and mixtures comprising same.

17. The flexible pipe according to claim 16, wherein the sealing layer is made from a thermoplastic material selected among polyaryletherketones.

18. A method of manufacturing a flexible pipe comprising the following steps:

provision of a tubular sheath of central axis (A-A') defining an internal passage for the circulation of fluids;

formation of a composite reinforcement structure applied around the tubular sheath (20) and bonded to the tubular sheath;

formation, around the composite reinforcement structure, of a sealing layer made of thermoplastic material, arrangement, around the sealing layer, of at least one tensile armor ply not bonded to the sealing layer, the at least one tensile armor ply comprising at least one tensile armor element wound around the sealing layer; and, optionally, arrangement of an external sealing sheath arranged around the at least one tensile armor ply, wherein the thickness of the sealing layer is less than 15 mm, and wherein the composite reinforcement structure includes at least one laminated composite reinforcement layer, each composite reinforcement layer including a polymer matrix and reinforcement fibers embedded in the matrix.

19. The method according to claim 18, wherein the formation of the sealing layer is achieved by:

winding at least two strips of thermoplastic material around the composite reinforcement structure, and welding of the at least two strips together.

20. The method according claim 18, wherein the formation of the sealing layer is achieved by extruding a thermoplastic material onto the composite reinforcement structure.

* * * * *